(12) United States Patent
Park

(10) Patent No.: US 11,764,827 B2
(45) Date of Patent: Sep. 19, 2023

(54) HYBRID RADIO FREQUENCY COMBINING SYSTEM WITH SIGNAL CANCELLATION

(71) Applicant: Nextivity, Inc., San Diego, CA (US)

(72) Inventor: Jeong Ho Park, San Diego, CA (US)

( * ) Notice: Subject to any disclaimer, the term of this patent is extended or adjusted under 35 U.S.C. 154(b) by 0 days.

(21) Appl. No.: 17/553,153

(22) Filed: Dec. 16, 2021

(65) Prior Publication Data

US 2022/0109465 A1 Apr. 7, 2022

Related U.S. Application Data

(63) Continuation of application No. 17/013,224, filed on Sep. 4, 2020, now abandoned.

(60) Provisional application No. 62/897,026, filed on Sep. 6, 2019.

(51) Int. Cl.
*H04B 1/525* (2015.01)
*H04B 1/40* (2015.01)
*H04B 15/00* (2006.01)

(52) U.S. Cl.
CPC ............. *H04B 1/525* (2013.01); *H04B 15/00* (2013.01)

(58) Field of Classification Search
CPC .......... H04B 1/04; H04B 1/0475; H04B 1/10; H04B 1/16; H04B 1/18; H04B 1/38; H04B 1/40; H04B 1/44; H04B 1/48; H04B 1/52; H04B 1/109; H04B 1/525; H04B 1/1027; H04B 1/7097; H04B 1/7107; H04B 3/32; H04B 7/15585; H04B 10/40; H04B 10/50572; H04B 10/50577; H04B 10/697; H04B 15/00; H04B 17/318; H04B 17/345; H04B 2201/0918; H04W 52/243; H04W 72/0453; H04W 72/082

See application file for complete search history.

(56) References Cited

U.S. PATENT DOCUMENTS

| | | | |
|---|---|---|---|
| 5,630,223 A | * | 5/1997 | Bahu ..................... H04B 1/525 455/24 |
| 6,151,354 A | | 11/2000 | Abbey |
| 7,450,065 B1 | | 11/2008 | Bruce et al. |
| 8,000,660 B1 | | 8/2011 | Woleben et al. |
| 8,036,606 B2 | | 10/2011 | Kenington |
| 8,170,487 B2 | | 5/2012 | Sahota et al. |

(Continued)

OTHER PUBLICATIONS

Invitation to Pay Additional Fees and, Where Applicable, Protest Fee dated Oct. 23, 2020 for International Application No. PCT/US2020/049524, 2 pages.

(Continued)

*Primary Examiner* — Quochien B Vuong
(74) *Attorney, Agent, or Firm* — FisherBroyles LLP; James P. Cleary

(57) ABSTRACT

A system and method for reducing intermodulation interference between a transmitter circuit and a receiver circuit includes a first hybrid combiner coupled to a transmit port, a second hybrid combiner coupled to an antenna port, a third hybrid combiner coupled to a receive port, a first three port network coupled to the first hybrid combiner, the second hybrid combiner, and the third hybrid combiner, and a second three port network coupled to the first hybrid combiner, the second hybrid combiner, and the third hybrid combiner. Related apparatus, systems, techniques and articles are also described.

7 Claims, 3 Drawing Sheets

(56) References Cited

U.S. PATENT DOCUMENTS

| | | | |
|---|---|---|---|
| 8,917,792 B2* | 12/2014 | Black | H04B 1/0475 |
| | | | 455/295 |
| 9,438,288 B2 | 9/2016 | Feld et al. | |
| 9,960,797 B2 | 5/2018 | Heinikoski et al. | |
| 10,277,260 B2 | 4/2019 | Khlat et al. | |
| 10,749,565 B1* | 8/2020 | Williams | H04B 1/525 |
| 2011/0110438 A1 | 5/2011 | Johansson | |
| 2011/0256857 A1* | 10/2011 | Chen | H04B 1/525 |
| | | | 455/63.1 |
| 2014/0085019 A1 | 3/2014 | Mei et al. | |
| 2014/0349595 A1 | 11/2014 | Cox | |
| 2016/0249365 A1 | 8/2016 | Harel | |
| 2016/0301436 A1 | 10/2016 | Zou et al. | |

OTHER PUBLICATIONS

International Search Report and Written Opinion dated Jan. 19, 2021 for International Application No. PCT/US2020/049524, 9 pages.

Laughlin, et al., A Widely Tunable Full Duplex Transceiver Combining Electrical Balance Isolation and Active Analog Cancellation, Available Online at: https://research-information.bris.ac.uk/ws/portalfiles/portal/84447917/Leo_Laughlin_etal_A_Wdely_Tunable_Full_Duplex_Tranceiver.pdf, 2015 IEEE 81st Vehicular Technology Conference (VTC Spring), 5 pages.

Non-Final Office Action dated Jun. 16, 2021 for U.S. Appl. No. 17/013,224, 20 pages.

* cited by examiner

HYBRID RADIO FREQUENCY COMBINING SYSTEM WITH SIGNAL CANCELLATION

CROSS-REFERENCE TO RELATED APPLICATIONS

The present application is a continuation of U.S. patent application Ser. No. 17/013,224, filed Sep. 4, 2020, and entitled "HYBRID RADIO FREQUENCY COMBINING SYSTEM WITH SIGNAL CANCELLATION", which claims the benefit of U.S. Provisional Application No. 62/897,026, filed Sep. 6, 2019, and entitled "HYBRID RADIO FREQUENCY COMBINING SYSTEM WITH SIGNAL CANCELLATION", the entire contents of each of which are incorporated herein by reference.

TECHNICAL FIELD

The subject matter described herein relates to hybrid radio frequency (RF) combining with signal cancellation, and in particular to a system and method for reducing intermodulation interference between a transmitter circuit and a receiver circuit.

BACKGROUND

Intermodulation (IM) or intermodulation distortion (IMD) is the amplitude modulation of signals containing two or more different frequencies, caused by nonlinearities or time variance in a system. The intermodulation between frequency components will form additional components at frequencies that are not just at harmonic frequencies (integer multiples) of either, like harmonic distortion, but also at the sum and difference frequencies of the original frequencies and at sums and differences of multiples of those frequencies.

Intermodulation can be caused by non-linear behavior of the signal processing (physical equipment or even algorithms) being used. Intermodulation is also usually undesirable in radio, as it can create unwanted spurious emissions, often in the form of sidebands. For radio transmissions this increases the occupied bandwidth, leading to adjacent channel interference, which can reduce audio clarity or increase spectrum usage.

SUMMARY

In some aspects, a system includes a first hybrid combiner coupled to a transmit port, a second hybrid combiner coupled to an antenna port, a third hybrid combiner coupled to a receive port, a first three port network coupled to the first hybrid combiner, the second hybrid combiner, and the third hybrid combiner, and a second three port network coupled to the first hybrid combiner, the second hybrid combiner, and the third hybrid combiner.

One or more of the following features can be included in any feasible combination. For example, the first hybrid combiner can be configured to split an input transmit signal to a first transmit output and a second transmit output. The first transmit output can be phase shifted. The first three port network can be configured to receive the second transmit output signal. The second three port network can be configured to receive the second transmit output signal. The second hybrid combiner can be configured to receive the first transmit output signal and the second transmit output signal, phase shift the first signal to form a phase-shifted signal, combine the phase-shifted signal with the second transmit output signal to form a combined signal, and provide the combined signal to the antenna port.

The second hybrid combiner can be configured to receive a receive signal from the antenna port, split the receive signal into a first receive output and a second receive output, the first receive output phase shifted, provide the first receive output to the first three port network, and provide the second receive output to the second combiner. The third hybrid combiner can be configured to receive the first receive output, phase shift the first receive output, receive the second receive output, combine the first receive output and the second receive output to form a combined receive output, and provide the combined receive output signal to the receive port.

The system can include a first gain block including circuitry, the first gain block coupled to the first hybrid combiner, the first three port network, and the second three port network. The system can include a second gain block including circuitry, the second gain block coupled to the third hybrid combiner, the first hybrid combiner, and the second hybrid combiner. The system can include control circuitry configured to receive the first receive output signal and the second receive output signal. The control circuitry can be configured to phase shift and/or attenuate at least one of the first receive output signal and/or the second receive output signal.

The control circuitry can include at least one phase shifter and at least one attenuator. The system can include control logic configured to: receive a first signal characterizing a transmit signal level at the transmit port; receive a second signal characterizing a receive signal level at the receive port; and control the control circuitry to reduce a level of transmit signal at the receive port. The system can include control logic configured to: receive a first signal characterizing a receive signal level at the receive port; determine intermodulation signal components of the first signal; and control the control circuitry to reduce a level of intermodulation signal component at the receive port. The system can include control logic configured to: receive a first signal characterizing a transmit signal level at the transmit port; receive a second signal characterizing a receive signal level at the receive port; determine intermodulation signal components of the second signal; and control the control circuitry to reduce a level of transmit signal at the receive port and to reduce a level of intermodulation signal component at the receive port.

In another aspect, a method includes receiving a first signal characterizing a transmit signal level at a transmit port, receiving a second signal characterizing a receive signal level at a receive port, and controlling control circuitry to reduce a level of transmit signal at the receive port.

One or more of the following features can be included in any feasible combination. For example, the receiving and the controlling can be performed by control logic forming part of circuitry that includes a first hybrid combiner coupled to the transmit port, a second hybrid combiner coupled to an antenna port, a third hybrid combiner coupled to the receive port, and a first three port network coupled to the first hybrid combiner, the second hybrid combiner, and the third hybrid combiner. The circuitry can further include a second three port network coupled to the first hybrid combiner, the second hybrid combiner, and the third hybrid combiner. The first hybrid combiner can be configured to split an input transmit signal to a first transmit output and a second transmit output. The first transmit output can be phase shifted and the first three port network can be configured to receive the second transmit output signal. The second three port network can be configured to receive the second transmit output signal.

The second hybrid combiner can be configured to receive the first transmit output signal and the second transmit output signal, phase shift the first signal to form a phase-shifted signal, combine the phase-shifted signal with the second transmit output signal to form a combined signal, and provide the combined signal to the antenna port. The second hybrid combiner can be configured to receive a receive signal from the antenna port, split the receive signal into a first receive output and a second receive output, the first receive output phase shifted, provide the first receive output to the first three port network, and provide the second receive output to the second combiner. The third hybrid combiner can be configured to receive the first receive output, phase shift the first receive output, receive the second receive output, combine the first receive output and the second receive output to form a combined receive output, and provide the combined receive output signal to the receive port.

A first gain block including circuitry can be included. The first gain block can be coupled to the first hybrid combiner, the first three port network, and the second three port network. A second gain block including circuitry can be included. The second gain block can be coupled to the third hybrid combiner, the first hybrid combiner, and the second hybrid combiner.

The control circuitry can be configured to receive the first receive output signal and the second receive output signal, the control circuitry configured to phase shift and/or attenuate at least one of the first receive output signal and/or the second receive output signal, where the control circuitry includes at least one phase shifter and at least one attenuator.

In yet another aspect, a method includes receiving a first signal characterizing a receive signal level at the receive port, determining intermodulation signal components of the first signal, and controlling control circuitry to reduce a level of the intermodulation signal components at the receive port.

One or more of the following features can be included in any feasible combination. For example, the receiving, the determining, and the controlling can be performed by control logic forming part of circuitry comprising: a first hybrid combiner coupled to a transmit port; a second hybrid combiner coupled to a antenna port, a third hybrid combiner coupled to the receive port, a first three port network coupled to the first hybrid combiner, the second hybrid combiner, and the third hybrid combiner, and a second three port network coupled to the first hybrid combiner, the second hybrid combiner, and the third hybrid combiner. The first hybrid combiner can be configured to split an input transmit signal to a first transmit output and a second transmit output, wherein the first transmit output is phase shifted.

The first three port network can be configured to receive the second transmit output signal. The second three port network can be configured to receive the second transmit output signal. The second hybrid combiner can be configured to receive the first transmit output signal and the second transmit output signal, phase shift the first signal to form a phase-shifted signal, combine the phase-shifted signal with the second transmit output signal to form a combined signal, and provide the combined signal to the antenna port. The second hybrid combiner can be configured to receive a receive signal from the antenna port, split the receive signal into a first receive output and a second receive output, the first receive output phase shifted, provide the first receive output to the first three port network, and provide the second receive output to the second combiner. The third hybrid combiner can be configured to receive the first receive output, phase shift the first receive output, receive the second receive output, combine the first receive output and the second receive output to form a combined receive output, and provide the combined receive output signal to the receive port.

A first gain block including circuitry can be included. The first gain block can be coupled to the first hybrid combiner, the first three port network, and the second three port network. A second gain block including circuitry can be included. The second gain block can be coupled to the third hybrid combiner, the first hybrid combiner, and the second hybrid combiner. The control circuitry can be configured to receive the first receive output signal and the second receive output signal, the control circuitry configured to phase shift and/or attenuate at least one of the first receive output signal and/or the second receive output signal. The control circuitry can include at least one phase shifter and at least one attenuator.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

RF systems that combine multiple signals at an antenna port can be used in wireless communication systems. Systems using Frequency Division Duplex (FDD) methods to separate transmit and receive signals at a single antenna can require filtering to protect the receiver circuit from interference caused by the transmitter circuit. Often this filtering is provided using duplexer filters fabricated using ceramic, surface acoustic wave (SAW), BAX, and cavity resonator technologies. Recently, approaches using circulators and hybrid combiners have started to become more popular.

A hybrid combiner (also referred to a hybrid splitter in some contexts) can include a device that includes two input ports and one output port, where the output signal is a combinations of the input signals with at least one of the input signals phase shifted (e.g., by 90 degrees, 180 degrees, and the like). Some hybrid combiners can be directional (e.g., signals can only pass from the inputs to output) while other hybrid combiners can be bi-directional (e.g., allowing signals to pass both directions, so that the device acts as a combiner in one direction and a splitter in another).

Some implementations of the current subject matter include a design using hybrid combiners that can reduce interference from a transmitter circuit to a receiver circuit where the interference can include not only noise, but Inter-Modulation Distortion (IMD) as well. Such an approach can be implemented, for example, in single antenna systems where a single antenna can be utilized for both the transmitting and receiving. Such systems can include, for example FDD approaches.

Figure 1:
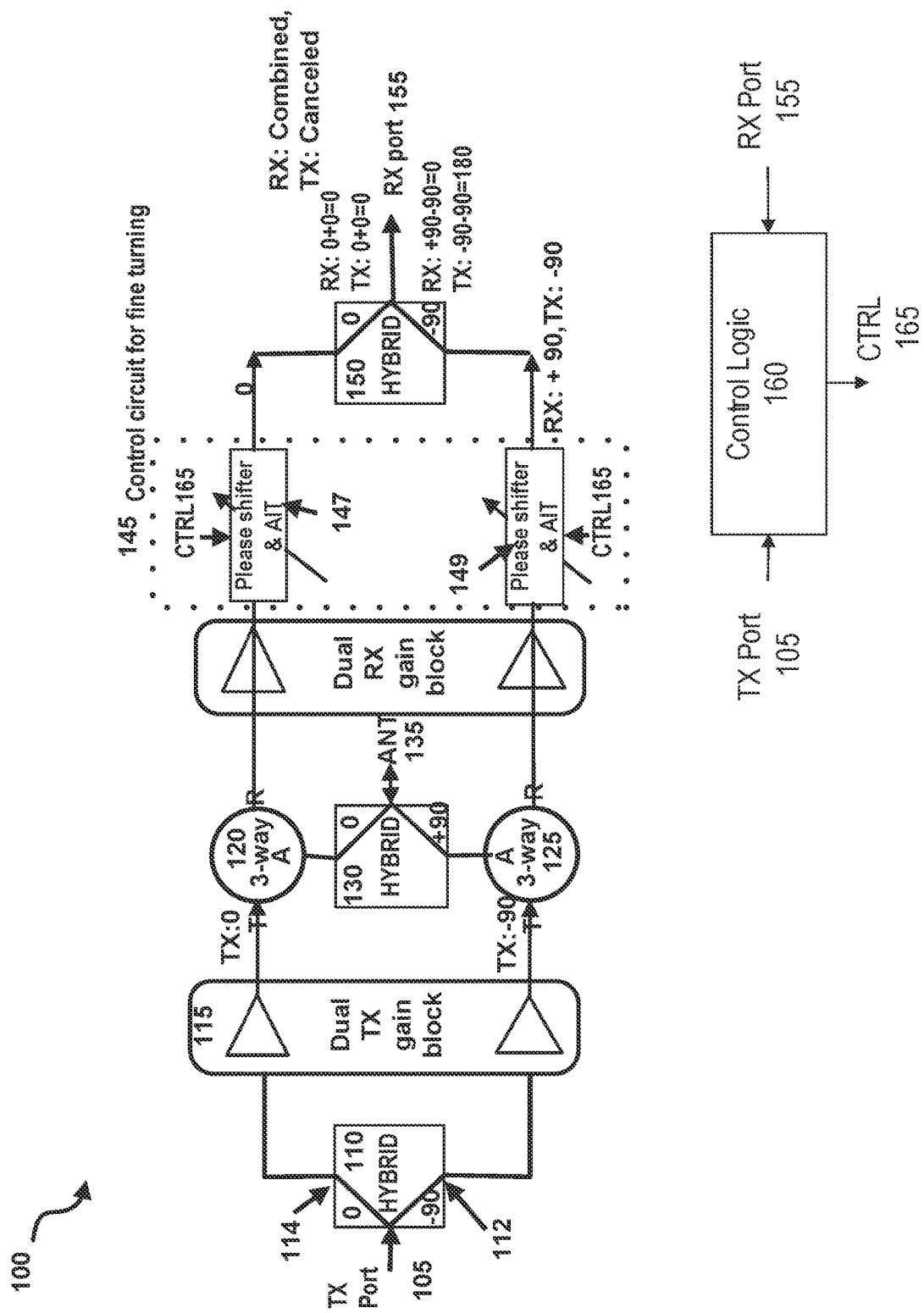
FIG. 1 is an example block diagram illustrating a circuit that can reduce interference between a transmitter circuit and a receiver circuit.

FIG. 1 is an example block diagram illustrating a circuit 100 that can reduce interference from a transmitter circuit to a receiver circuit. The circuit 100 can include a transmit (TX) path and a receive (RX) path.

The transmit path can include a TX port 105 coupled to a first hybrid combiner 110. The first hybrid combiner 110 includes two output ports, 112 and 114, which output 0-degree phase shifted and 90 degree phase shifted signals. The outputs 112, 114 of the first hybrid combiner 110 are respectively coupled to a dual transmit gain block 115. In some implementations, the dual transmit gain block 115 can have a gain of 1 (e.g., can be omitted such that there is only a wire or other electrical connection). The dual transmit gain block 115 is coupled to a first three port network 120 and a second three port network 125. The first and second three port network 120, 125 can coupled to a second hybrid combiner 130, which can include a port 132 coupled to an antenna 135.

In some implementations, the first and second three port networks 120, 125 can be implemented as a duplexer, a circulator, and/or the like.

The receive path can include the antenna 135, second hybrid combiner 130, and three port networks 120, 125. The three port networks 120, 125 can each be connected to a dual receive gain block 140. In some implementations, the dual receive gain block 140 can have a gain of 1 (e.g., can be omitted such that there is only a wire or other electrical connection). The dual receive gain block 140 can couple to a control circuit 145, which can include one or more phase shifters and/or attenuators 147, 149, that can enable fine tuning of operation of the interference cancellation. In some implementations, the control circuit 145 can be omitted (e.g., a wire or other electrical connection) or configured to pass signals through without modification. The control circuit 145 can couple to a third hybrid combiner 150, which can include a receive output port 155.

In operation, in order to transmit a signal, a transmission signal is provided to TX port 105 of hybrid combiner 110. Hybrid combiner 110 acts as a splitter, splitting the input signal into a first signal with 0 degree phase shift and a second signal with −90 degree phase shift. These signals are then amplified by dual transmit gain block 115 and provided respectively to the three port networks 120, 125, which provide their respective outputs to the second hybrid combiner 130. The second hybrid combiner 130 combines the two input signals, phase shifting the −90 degree phase shifted signal by +90 degrees. The recombined signal is provided to antenna 135 for transmission.

In operation, in order to receive a signal, a signal is received by antenna 135 and provided to second hybrid combiner 130, which operates to split the received signal into two signals, a first signal with 0 degree phase shift and a second signal with +90 degree phase shift. The two outputs of the second hybrid combiner 130 are provided respectively to the three port networks 120, 125, which provide their respective outputs to the dual receive gain block 140. The dual receive gain block 140 amplifies the signals and provides the amplified signals to the control circuit 145. The outputs of the control circuit 145 are provided to third hybrid combiner 150, which combines the two signals, phase shifting the +90 degree phase shifted signal by −90 degrees. The recombined signal is provided to receive port 155.

In some implementations, the system 100 can include control logic 160 that can be configured to control circuitry 145 in order to reduce or minimize the level of transmit signal at the receive port 155 and/or to reduce or minimize the level of inter-modulation signals present at the receive port 155. The control logic 160 can receive as input the level of signal applied to the transmit port 105 and the level of signal present at the receive port 155 and output a control signal 165 that adapts (e.g., controls) the control circuitry 145 to reduce or minimize the level of transmit signal at the receive port 155. The control signal 165 can operate to modify the phase shifters and attenuators 147, 149. The control circuitry 145 may for example monitor the transmit signal leakage at the Rx port 155 and adjust the phase sifter and attenuator 147 and 149 so as to minimize the level of the transmit signal applied to the transmit port 105 at the Rx port 155.

Similarly, in some implementations, the control logic 160 can take as input the level of intermodulation signals present at the receive port 155 and adapt the elements of the control circuit 145 to reduce or minimize the level of intermodulation signals present at the receive port 155. The basic interference cancellation operation can be obtained by using the phase shifting characteristic of the hybrid combiner to align interference signals with a 180 degree phase shift and then adding them up to achieve cancellation. For example, a signal applied to port 105 and travels to port 155 via the top path in FIG. 1 would see a 0 degree rotation through the hybrid combiner 110 as well as a 0 degree phase shift through the hybrid combiner 150 to arrive at port 155 with 0 degree phase shift. A signal applied to port 105 travels to port 155 via the bottom path in FIG. 1 would see a −90 degree rotation through the hybrid combiner 110 as well as a −90 degree phase shift through the hybrid combiner 150 to arrive at port 155 with 180 degree phase shift. The signal traveling in both paths are the same as they are derived from the input to 105, and they will cancel out after hybrid combining in 150 due to the 180 degree phase shift between the signals. In some implementations, control logic 160 can modify the control circuit 145 to jointly reduce or minimize the interference and intermodulation signals present at the receive port 155 (e.g., optimize the circuit for both noise and intermodulation distortion performance).

Figure 2:
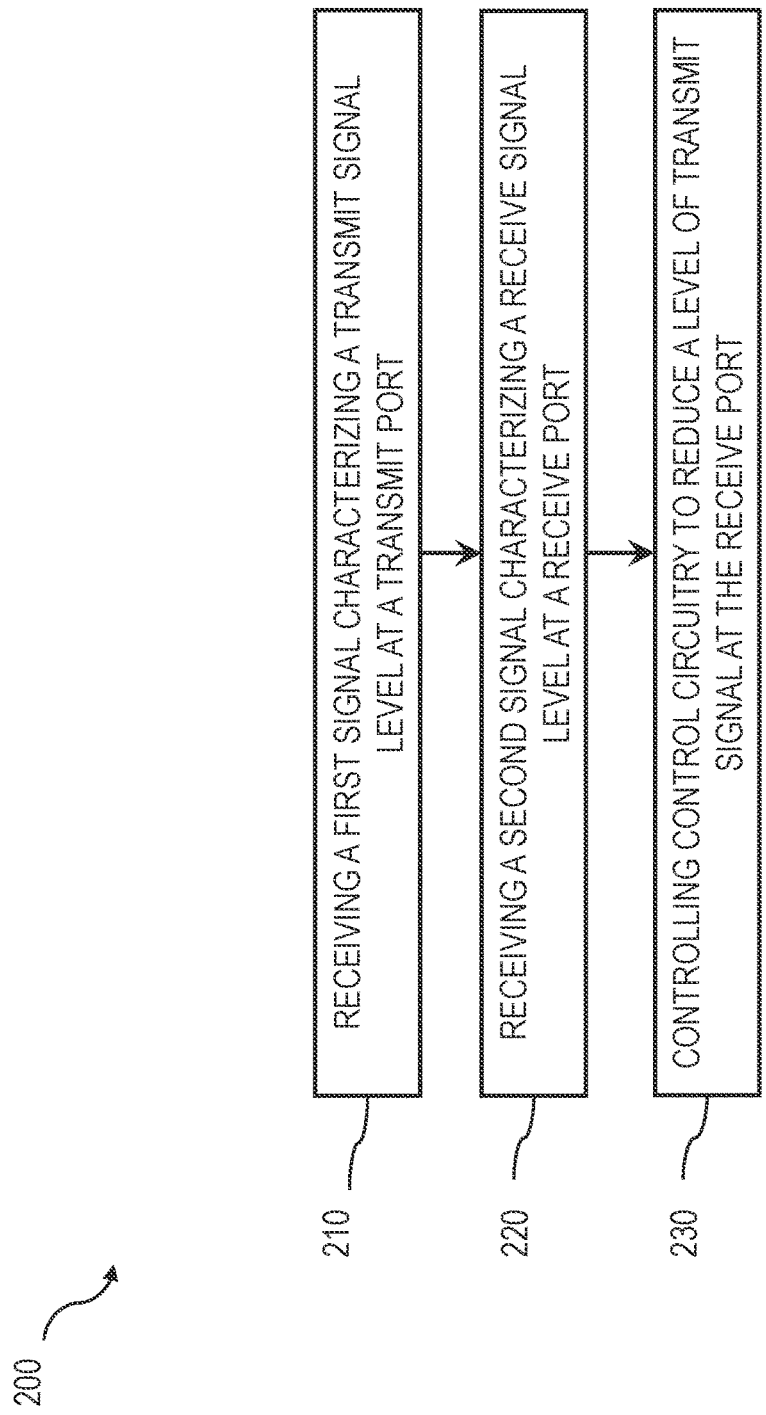
FIG. 2 is a process flow diagram illustrating an example method according to some example implementations of the current subject matter that can reduce interference between a transmitter circuit and a receiver circuit.

FIG. 2 is a process flow diagram illustrating an example method 200 according to some example implementations of the current subject matter that can reduce interference from a transmitter circuit to a receiver circuit. At 210, a first signal characterizing a transmit signal level at a transmit port can be received. At 220 a second signal characterizing a receive signal level at a receive port can be received. At 230, control circuitry can be controlled to reduce a level of transmit signal at the receive port.

Figure 3:
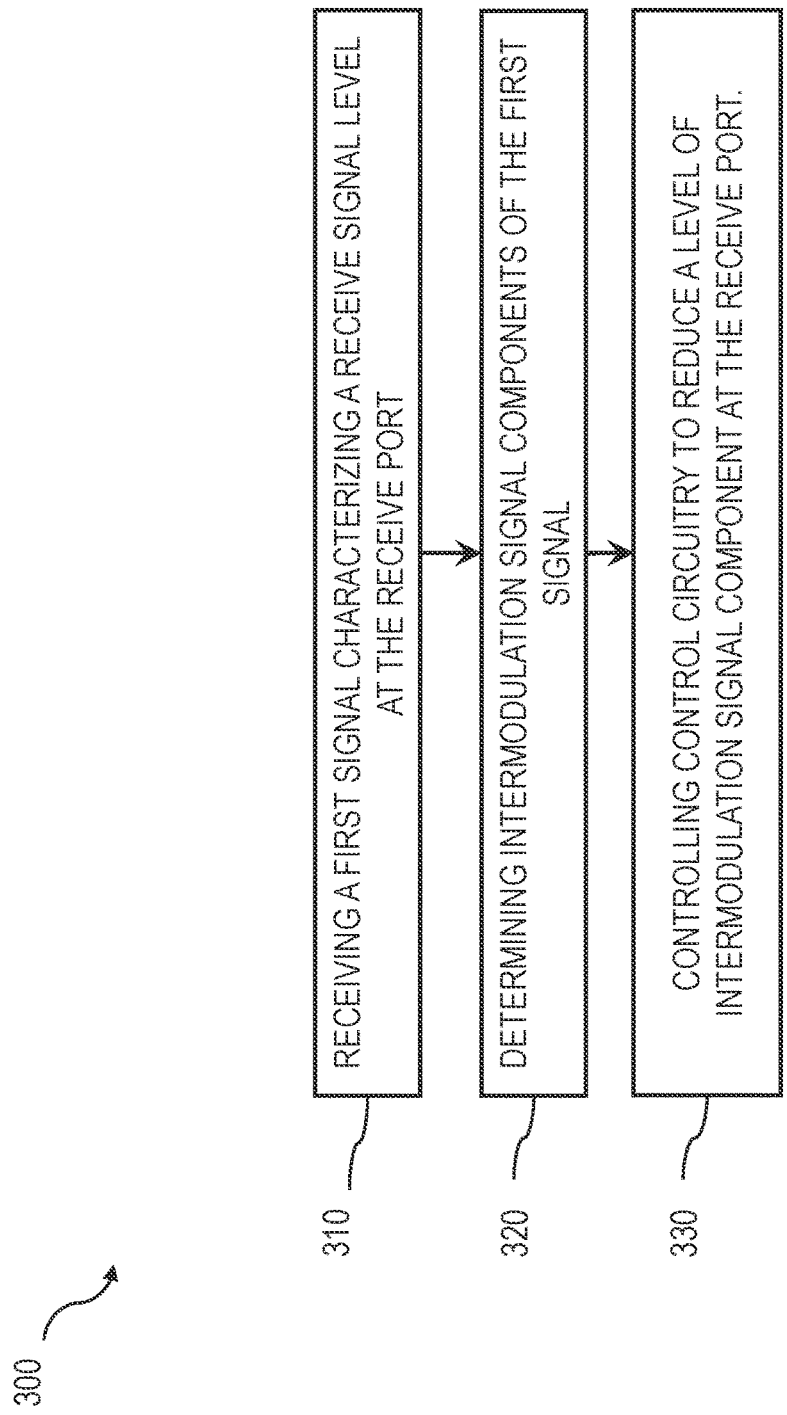
FIG. 3 is a process flow diagram illustrating an example method according to some example implementations of the current subject matter that can reduce interference between a transmitter circuit and a receiver circuit.

FIG. 3 is a process flow diagram illustrating an example method 300 according to some example implementations of the current subject matter that can reduce interference from a transmitter circuit to a receiver circuit. At 310, a first signal characterizing a receive signal level at the receive port can be received. Intermodulation signal components of the first signal can be determined. Control circuitry can be adapted (e.g., controlled) to reduce a level of intermodulation signal component at the receive port.

The systems and methods according to some implementations of the current subject matter can achieve interference cancellation because it utilizes three 90 degree hybrid combiners to achieve a system where transmit interference at the receive port is minimized.

Although a few variations have been described in detail above, other modifications or additions are possible. For example, the example circuit described above can perform a linear operation and therefore the order of operation may be changed. For example, control circuitry 145 may be performed before the gain block 140 or control circuitry 145 can be placed directly after 115.

The subject matter described herein provides many technical advantages. For example, a system and method described herein provides improved Rx/Tx isolation, compared to a duplexer or circulator only. Also, the circuit can cancel some or all IMD components that are generated between the TX port 105 and the RX port 155.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system for reducing intermodulation interference between a transmitter circuit and a receiver circuit, the system comprising:
   a first hybrid combiner coupled to a transmit port;
   a second hybrid combiner coupled to an antenna port;
   a third hybrid combiner coupled to a receive port;
   a first three port network coupled to the first hybrid combiner, the second hybrid combiner, and the third hybrid combiner;
   a second three port network coupled to the first hybrid combiner, the second hybrid combiner, and the third hybrid combiner;
   a first gain block circuit coupled to the first hybrid combiner, the first three port network, and the second three port network; and
   a second gain block including circuitry, the second gain block coupled to the third hybrid combiner, the first hybrid combiner, and the second hybrid combiner.

2. The system of claim 1, further comprising control circuitry configured to receive a first receive output signal and a second receive output signal, the control circuitry configured to phase shift and/or attenuate at least one of the first receive output signal and/or the second receive output signal.

3. The system of claim 2, wherein the control circuitry includes at least one phase shifter and at least one attenuator.

4. The system of claim 2, further comprising control logic configured to:
   receive a first signal characterizing a transmit signal level at the transmit port;
   receive a second signal characterizing a receive signal level at the receive port; and
   control the control circuitry to reduce a level of transmit signal at the receive port.

5. The system of claim 2, further comprising control logic configured to:
   receive a first signal characterizing a receive signal level at the receive port;
   determine intermodulation signal components of the first signal; and
   control the control circuitry to reduce a level of intermodulation signal component at the receive port.

6. The system of claim 2, further comprising control logic configured to:
- receive a first signal characterizing a transmit signal level at the transmit port;
- receive a second signal characterizing a receive signal level at the receive port;

determine intermodulation signal components of the second signal; and
- control the control circuitry to reduce a level of transmit signal at the receive port and to reduce a level of intermodulation signal component at the receive port.

7. The system of claim 2, wherein the control circuitry is formed as one or more application specific integrated circuits (ASICs).

\* \* \* \* \*